(12) United States Patent
Yu et al.

(10) Patent No.: US 7,776,170 B2
(45) Date of Patent: Aug. 17, 2010

(54) FIRE-RESISTANT GYPSUM PANEL

(75) Inventors: Qiang Yu, Grayslake, IL (US);
Frederick T. Jones, Grayslake, IL (US);
Qingxia Liu, Vernon Hills, IL (US)

(73) Assignee: United States Gypsum Company, Chicago, IL (US)

( * ) Notice: Subject to any disclaimer, the term of this patent is extended or adjusted under 35 U.S.C. 154(b) by 341 days.

(21) Appl. No.: 11/546,736

(22) Filed: Oct. 12, 2006

(65) Prior Publication Data

US 2008/0087366 A1  Apr. 17, 2008

(51) Int. Cl.
| | |
|---|---|
| *B32B 1/04* | (2006.01) |
| *B32B 3/02* | (2006.01) |
| *B32B 3/00* | (2006.01) |
| *B32B 13/00* | (2006.01) |
| *B32B 37/00* | (2006.01) |
| *B32B 1/00* | (2006.01) |
| *B32B 29/00* | (2006.01) |
| *B29C 65/00* | (2006.01) |

(52) U.S. Cl. .............. 156/39; 156/40; 156/41; 156/42; 156/43; 156/44; 428/68; 428/69; 428/70; 428/71; 428/72; 428/73; 428/74

(58) Field of Classification Search ............. 156/39–44; 428/68–74
See application file for complete search history.

(56) References Cited

U.S. PATENT DOCUMENTS

| | | |
|---|---|---|
| 1,502,603 A | 7/1924 | Walper |
| 4,037,006 A | 7/1977 | Roberts et al. |
| 4,159,361 A | 6/1979 | Schupack |
| 4,647,486 A * | 3/1987 | Ali .............................. 428/70 |
| 4,664,707 A * | 5/1987 | Wilson et al. ............ 106/18.11 |
| 4,693,924 A | 9/1987 | Kuper et al. |
| 4,955,171 A | 9/1990 | Kossatz et al. |
| 5,305,577 A | 4/1994 | Richards et al. |
| 5,644,880 A | 7/1997 | Lehnert |
| 5,797,238 A | 8/1998 | Berntsson et al. |
| 6,230,458 B1 | 5/2001 | Silc et al. |
| 6,274,647 B1 * | 8/2001 | Knight et al. ................ 523/179 |
| 6,410,122 B1 | 6/2002 | Tono et al. |
| 6,475,313 B1 | 11/2002 | Peterson et al. |
| 6,524,679 B2 | 2/2003 | Hauber et al. |
| 6,643,991 B1 * | 11/2003 | Moyes ..................... 52/784.11 |
| 6,648,965 B2 | 11/2003 | Klus |

(Continued)

*Primary Examiner*—Philip C Tucker
*Assistant Examiner*—Michael N Orlando
(74) *Attorney, Agent, or Firm*—Greer, Burns & Crain, Ltd.; David F. Janci, Esq.; Pradip Sahu, Esq.

(57) ABSTRACT

A method of continuously forming a multilayer panel includes making a gypsum slurry, then dividing the gypsum slurry into at least a primary gypsum slurry and a secondary gypsum slurry. An additive slurry having water and an intumescent material is created, then added to the secondary gypsum slurry to make an expandable layer slurry that is spread over at least a portion of a facing material. The primary gypsum slurry is distributed over the secondary gypsum slurry over the facing material and the expanding layer slurry to form a core. Optionally, another layer, an edge coating, is applied to the expanding layer for additional fire protection. The edge coating includes a second intumescent material. During a fire, the expanding layer expands to increase the thickness of the fire exposed gypsum panel and the edge coating expands to seal the gap between adjoining gypsum panels.

18 Claims, 1 Drawing Sheet

U.S. PATENT DOCUMENTS

Figure 1:
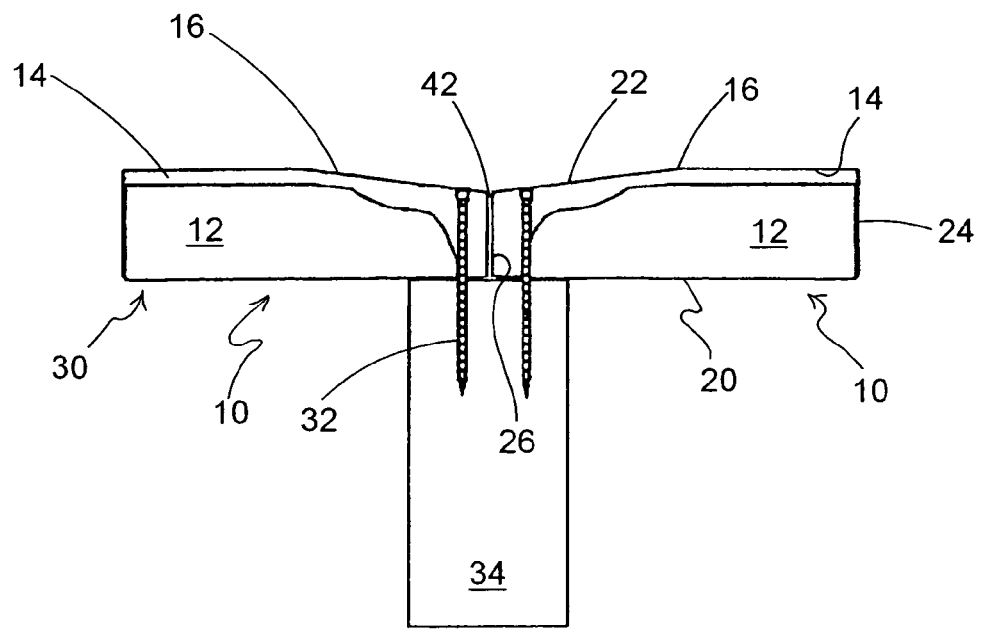

| | | |
|---|---|---|
| 2002/0095893 A1 | 7/2002 | Walters et al. |
| 2004/0152379 A1 | 8/2004 | McLarty, III et al. |
| 2005/0009428 A1 | 1/2005 | Porter et al. |
| 2005/0121131 A1 | 6/2005 | Hennis et al. |
| 2005/0159057 A1 | 7/2005 | Hauber et al. |
| 2005/0202742 A1* | 9/2005 | Smith et al. ................. 442/256 |
| 2005/0233657 A1 | 10/2005 | Grove et al. |
| 2006/0134371 A1 | 6/2006 | Dubey |

* cited by examiner

FIRE-RESISTANT GYPSUM PANEL

BACKGROUND

The present invention relates to a gypsum panel product and process for making it. More particularly, the present invention relates to a gypsum panel with improved fire resistance using an expandable surface layer.

Gypsum panels are well known building products which have been used for years. They are used primarily as an interior wall and ceiling product, but also to a certain extent as an exterior product. A slurry including calcium sulfate hemihydrate and water is used to form the core, and continuously deposited on a paper cover sheet moving beneath a mixer. A second paper cover sheet is applied thereover and the resultant assembly is formed into the shape of a panel. Calcium sulfate hemihydrate or stucco reacts with sufficient water to convert the hemihydrate stucco into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture.

The chemically combined water in the dihydrate crystal contributes to the fire-retardant properties of the gypsum panel. When exposed to heat or fire, the dihydrate is converted back into the hemihydrate or even the anhydrite forms. Excess water of hydration is driven off in the form of steam. As the steam is released, heat transmission through the panel is reduced as the heat energy from the fire is used to drive the dehydration reactions and to vaporize the water. Thicker gypsum panels provide more fire resistance than thinner ones as it takes longer for the heat to penetrate the entire thickness of the panel to drive off the all crystal water.

The loss of the crystal water normally leads to shrinkage of the gypsum. Because much of the crystal water is lost and the original tight interlocking gypsum matrix is loosed, the gypsum products also tend to become very brittle and lost its strength and integrity under the fire. Large cracks can form in the gypsum panel due to the shrinkage. Shrinkage also causes enlargement of the opening between the panels at the edge joints. Enlargement of the edge joint, large cracks and other openings allow accelerated transmission of heat and hot gasses through the wall, and can also allow the fire to reach wood studs behind the gypsum panels to further fuel the fire.

Introduction of certain fibers, ores and/or inorganic particles into the gypsum core are known to improve the fire resistant properties of gypsum panels. The use of glass fibers to maintain the panel strength and integrity is taught in U.S. Pat. No. 4,647,486. This patent also reveals the addition of calcium sulfate anhydrite 11 to the core slurry to reduce shrinkage.

The introduction of expandable material into the gypsum core of a panel is also used as a method of improving the fire resistance of these panels. As the board heats up in the presence of the fire, intumescent materials expand to at least partially take the place of the water being displaced. It would take much longer for the board to burn through or form large cracks compared to non-expanding gypsum core. However, the use of intumescent materials throughout a gypsum core is relatively expensive and causes health and environmental concern because large amounts of the organic additive are needed for uniform dispersion throughout the gypsum slurry.

A wall or floor/ceiling assembly fire test simply measures the time it takes for the system to reach the limiting criteria specified in Standard ASTM (the American Society for Testing and Materials) E119 Test Procedure. For a wall assembly, the limiting criteria is defined as passage of heat energy through the wall, exceeding of a prescribed temperature rise on the unexposed face of the wall, the ability of the wall to carry a superimposed design load during the fire (for load-bearing walls), or projection of water through the assembly. Per ASTM C36, a ⅝-inch (16 mm) thick Type X panel must provide no less than a one-hour fire resistance rating when applied in a single layer on each face of a load-bearing wood-stud wall when tested in accordance with ASTM E119. A ½-inch (12 mm) Type X panel must provide a 45-minute fire resistance rating on the same assembly.

A second type of fire-resistant gypsum panel, known as Type C (enhanced Type X), provides even better performance. In addition to glass fiber additives, Type C panels contain the special minerals that expand in the presence of heat, somewhat compensating for the panel shrinkage resulting from the dehydration and melting of the gypsum. This helps add stability to the gypsum core, significantly enhancing the panel's fire-resistant performance.

SUMMARY OF THE INVENTION

There is a need in the art for a gypsum panel with improved fire resistance that does not require large amounts of normal intumescent materials. There is also a need in the art for a fire resistant layer that can be used on a gypsum panel that expands to improve fire protection.

These and other needs are met by a gypsum panel having a core that includes gypsum and a high temperature, shrinkage-resistant material. The core is formed into a panel having at least two opposing faces and two opposing edges. At least one of the edges and/or the faces is coated with an expandable layer that includes a gypsum matrix having a density higher than the core and an intumescent or expandable material. A facing material covers at least a portion of the expandable layer.

A method of continuously forming a multilayer panel includes making a gypsum slurry, then dividing the gypsum slurry into at least a primary gypsum slurry and a secondary gypsum slurry. An additive slurry having water and an intumescent material is created, then added to the secondary gypsum slurry to make an expandable layer slurry that is spread over the entire or at least a portion of a facing material. The primary gypsum slurry is distributed over the primary gypsum slurry over the facing material and the expandable layer slurry to form a core.

Optionally, another layer, an edge coating, is applied to the expandable layer for additional fire protection. The edge coating includes a second intumescent material. During a fire, the edge coating expands to seal the gap between adjoining gypsum panels.

For the amount of intumescent material used, its addition to an expandable layer rather than the core slurry provides more of an increase in thickness, thus improving the fire resistance. If equivalent fire resistance is desired, the amount of intumescent material in the expandable layer can be reduced, thereby lowering the materials cost.

Reduction in the amount of additives to a gypsum panel also reduces the overall weight of the product. In addition to the cost savings in limiting the amount of additives, reduction of panel weight also reduces shipping costs and reduces fatigue in workers who carry or install the panels.

DETAILED DESCRIPTION OF THE DRAWINGS

Figure 2:
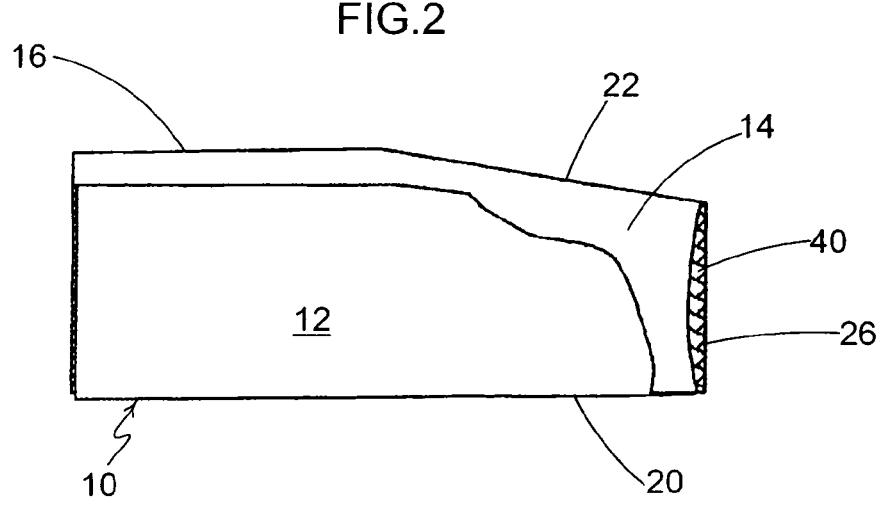

FIG. 1 is a cross-section of a substrate and gypsum panel of the present invention; and FIG. 2 is a cross-section of a gypsum panel of the present invention shown with optional edge coating.

DETAILED DESCRIPTION OF THE INVENTION

Referring now to FIG. 1, the present invention includes a multilayer gypsum panel, generally 10, that includes a core 12, an expandable layer 14 and a facing material 16. Inclusion of additional layers or coverings with this panel is contemplated. The gypsum panel 10 includes at least two opposing faces 20, 22 and two opposing edges 24, 26. During the manufacture of the gypsum panels, a continuous strip of core material 12 is produced that is cut to form individual panels, generally 30. Each panel 30 preferably includes at least two sets of opposing edges. There are a set of opposing cut edges (not shown) where the panels 30 were separated from one another, and a set of opposing finished edges 24, 26.

The panel core 12 is made from a primary gypsum slurry that includes calcium sulfate hemihydrate, a shrinkage-resistant material and water. A secondary slurry including the same components is used to make the expandable layer 14. Details of each of the components and their respective amounts in each of the slurries are discussed in more detail below.

An essential ingredient of both the panel core 12 and the expandable layer 14 is gypsum, also known as landplaster, terra alba or calcium sulfate dihydrate. Gypsum is made into the panel by adding water to stucco, also known as plaster of Paris, calcined gypsum or calcium sulfate hemihydrate, to form a slurry. The calcium sulfate hemihydrate is hydrated with water to form an interlocking matrix of calcium sulfate dihydrate crystals. Any calcined gypsum comprising calcium sulfate hemihydrate, calcium sulfate anhydrite or both is useful in either of the slurries.

Calcium sulfate hemihydrate can produce at least two common crystal forms, the alpha and beta forms. Beta calcium sulfate hemihydrate is commonly used in gypsum board panels, but is also contemplated that panels made of alpha calcium sulfate hemihydrate or mixtures of alpha and beta hemihydrate are also useful in this invention. Beta-calcined stucco is the preferred calcium sulfate hemihydrate in both the primary and secondary slurry. Anhydrite gypsum is contemplated for use as a minor component of the calcined gypsum, preferably in amounts of less than 20% by weight of the calcined gypsum content in either slurry.

Gypsum composites vary in their silica content and the amount and types of soluble salts that are present in the deposits. These deposits are not generally removed prior to calcining, and are therefore present in the calcium sulfate hemihydrate. The presence of certain low melting point soluble salts, especially chlorides, reduce the melting point of the gypsum composite and can result in dramatic high-temperature shrinkage. Melting-down of the gypsum composite has been confirmed by SEM examination. A high soluble salt content in the gypsum composite lowers the melting point and increases the shrinkage of the gypsum. Preferably, the soluble salt content is less than 0.2% by weight.

Another desirable property of the stucco is a high silica content, the preferred silica content is clay minerals such as kaolin clay. Stuccos having a high silica content in the gypsum composite increases the melting point. This is preferred for better fire resistance. An example of a high silica calcium sulfate hemihydrate is more than 1% silica or more than 2% clay content by weight.

In a preferred embodiment of the invention, both the core 12 and the expandable layer 14 include at least 50% calcium sulfate hemihydrate by weight of the dry components. More preferably, the core 12 comprises at least 60% calcium sulfate hemihydrate and even more preferably from 70-99% by weight. Preferred amounts of stucco in the core 12 are from about 70 to about 90 wt % based on the weight of the dry solids.

The expandable layer 14 often has less stucco on a weight percentage basis since it has at least one additional component. Amounts of stucco in the expandable layer 14 preferably range from 60% to about 90% based on the weight of the dry solids in the slurry.

Another essential component of both the core 12 and the expandable layer 14 is a high temperature, shrinkage-resistant material. Any material that is compatible with the other components and does not shrink is useful as a shrinkage-resistant material. Most shrinkage-resistant materials are fillers that increase the melting point of gypsum composite to reduce or to prevent the shrink at high temperatures. By replacing stucco with small amount of these fillers, the set core 12 shrinks much less as compared to the set core without these fillers. Examples of shrinkage-resistant materials include fiberglass, glass or synthetic fibers, silica fume, diatomite and clays such as kaolin clay. Many silica-rich minerals act to reduce shrinkage in gypsum. Preferably, the core is free of intumescent materials for cost concerns. The shrinkage resistant material is used in amounts of 0.1% to about 3% by weight based on the dry components. A preferred shrinkage-resistant material is kaolin clay. It should also be noted that not all glass fibers are shrinkage-resistant. Only shrinkage-resistant materials are useful in this component.

In addition to shrinkage-resistant material, the glass fibers (normally ½"-¾" in length and 10-16 microns in diameter with melting point above 800° C.) were added into the gypsum core and the expandable layer to keep the whole gypsum panel together (or hold the integrity) after both facing papers was burned off under the fire.

The fourth essential component of the gypsum core 12 and the expandable layer 14 is water. During manufacture of the gypsum articles, the water is present as a liquid. The stucco and the shrink-resistant material are added to the water to form a slurry. Preferably, the water is as pure as practical to reduce side reactions. As discussed above, the presence of certain salts can modify the setting rate of the gypsum as well as the tendency to shrink. Limiting the amount of salts introduced with the water will make it easier to control the set time and the shrinkage in the product.

In some optional embodiments of the invention, one or more additives are included in either the primary gypsum slurry, the secondary gypsum slurry or both. Concentrations are reported in amounts per 1000 square feet (93 $m^2$) of finished board panels ("MSF"). Set retarders (up to about 2 lb./MSF) (up to about 9.7 g/$m^2$) or accelerators (Up to about 35 lb./MSF) (up to about 170 g/$m^2$) are added to modify the rate at which the hydration reactions take place. "CSA" is a set accelerator comprising 95% calcium sulfate dihydrate co-ground with 5% sugar and boric acid and heated to 250° F. (121° C.) to caramelize the sugar. CSA is available from USG Corporation, Southard, Okla. Plant, and is made according to U.S. Pat. No. 3,573,947, herein incorporated by reference.

In addition, the core 12 and/or expandable layer 14 composition optionally include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Burge Milling Inc. and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition.

Other optional components are used to modify one or more properties of the core 12 and/or the expandable layer 14 of the final product up to 15 lb./MSF (up to about 73 g/m$^2$) of paper fibers are also added to the slurry. Dispersants or surfactants are common additives to modify the viscosity or surface properties of the slurry. Naphthalene sulfonates are preferred dispersants, such DILOFLO® from Geo Specialty Chemicals, Cleveland, Ohio. Preferably, a dispersant is added to the core slurry in amounts up to 16 lb./MSF (up to 78 g/m$^2$). Wax emulsions, discussed in more detail below, are added to the gypsum slurry in amounts up to 20 gal./MSF (0.8 l/m$^2$) to improve the water-resistency of the finished gypsum board panel. Pyrithione salts are useful in addition to other preservatives. There are no known adverse effects when pyrithione salts are used together with any other additives. It is therefore contemplated that pyrithione salts are useful when combined with any additives added to the gypsum core slurry to modify other properties of the set gypsum core 12.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. from GEO Specialty Chemicals, Ambler, Pa. Foams and a preferred method for preparing foamed gypsum products are disclosed in U.S. Pat. No. 5,683,635, herein incorporated by reference. If foaming agents are used, the foam is preferably generated separately from the gypsum slurry. The pre-generated foam is then injected into the slurry as it exits the slurry mixer. The entire slurry is discharged from the mixer. As it exits or immediately after the exit, the slurry is divided into at least two portions. The foam is pumped into at least one of the slurry streams that will form the gypsum core 12. The slurry and the foam stream are then moved down stream to become the gypsum core 12. No additional mixing is necessary after foam addition. The foam and slurry mix sufficiently as it moves through the hoses and conduits to the forming table.

In some embodiments, a trimetaphosphate compound is added to the gypsum slurry used to make the core 12 and/or the expandable layer 14 to enhance the strength of the product and to reduce sag resistance of the set gypsum. Preferably the concentration of the trimetaphosphate compound is from about 0.1% to about 2.0% based on the weight of the calcined gypsum. Gypsum compositions including trimetaphosphate compounds are disclosed in U.S. Pat. No. 6,342,284, herein incorporated by reference. Exemplary trimetaphosphate salts include sodium, potassium or lithium salts of trimetaphosphate, such as those available from Astaris, LLC., St. Louis, Mo.

The slurries are made by any method known by those skilled in the art. In a preferred embodiment, each of the slurries is made by combining dry components, such as calcium sulfate hemihydrate and the shrinkage resistant material. Wet components, if present, are added directly to the water. The dry components are then added to the wet components, mixed and dispensed in a continuous fashion.

Mixing of the primary and secondary slurries in separate mixers is anticipated. However, in other embodiments, a common slurry is mixed and divided into a primary slurry and a secondary slurry when it is dispensed from the mixer, since the expanding layer 14 is made from the secondary gypsum slurry that is very similar to that used in the primary gypsum core 12. The secondary slurry is obtainable as a slip stream of the primary slurry, or it can be separately assembled. When a slip stream is taken from the primary gypsum slurry, is it preferably separated as the primary slurry exits the slurry mixer.

Density of the secondary slurry is preferably higher in density than the gypsum core 12. High density character of the second slurry is achievable many different ways. Preferably, the density of the secondary slurry is increased by reducing the total void volume of the secondary slurry. In one embodiment, the secondary slurry is made without foam addition. Another embodiment adds less foam to the secondary slurry than is included in the primary slurry. Where there is less foam, there is less entrained air to reduce the gypsum density. In yet another embodiment, the same amount of foam is added to both the primary slurry and the secondary slurry, then the secondary slurry is agitated, beaten or otherwise treated to break some of the foam bubbles, thereby increasing the density compared to the primary slurry.

Intumescent materials are added to the secondary slurry. An intumescent material is one that undergoes a chemical or physical change when exposed to heat or flames that causes it to expand. Some minerals, such as perlite or vermiculite, expand like popcorn when water released from their crystals and fissures suddenly expands due to heat. Other minerals, such as intumescent polymer systems, become viscous, then form expanding bubbles that harden into a dense, heat insulating multi-cellular char. However, care should be taken to ensure that the polymer expands under normal fire conditions. Expandable graphite and perlite are used, in the art, as intumescent materials. Mica and vermiculite, however, are preferred examples of intumescent materials due to their functionality, reasonable cost, and ready availability.

The amount of the intumescent material depends on the exact material chosen. When vermiculite is used, it is preferably used in amounts of about 5% to more than 20 weight % based on the weight of the secondary slurry, as the amount of intumescent material increases.

A preferred embodiment of this invention includes a firecode gypsum panel 10. Type X, or fire-resistant gypsum panels 10, contain additives such as chopped glass fiber that are incorporated into the gypsum core 12. When exposed to fire and after both facing papers 16 are burned off, these additives serve to bridge the gypsum crystals and reduce the size of cracks that form as the panel's water is converted to steam. This further prolongs the integrity of the panel 10, enabling it to continue to act as fire a barrier and thus retard the passage of heat through the wall or ceiling assembles.

The expandable layer 14 covers at least a portion of at least one of the faces 20, 22, at least one of the edges 24, 26 or combinations thereof. The expanding layer 14 is preferably applied to at least one of the edges 24, 26 or on the face 20, 22 of the panel near the edges. When exposed to a heat source such as a fire, the expandable layer 14 expands and helps to fill voids left by evaporating water, thicken the panel 10, seal the space between the panels, seal cracks that may be forming in the panel, take space reducing the edge joint opening and making it more difficult for the fire or hot gases to get through the exposed panel. Areas most likely to benefit from the expandable layer 14 are on the edges 24, 26 that abut an edge 24, 26 of an adjacent panel 10, and the facing surface or surfaces within several inches of the edges 24, 26 and/or near fasteners 32 that secure the panel 10 to a substrate 34. Optionally, the expandable layer 14 is thicker near the edge 24, 26 of the panel 10.

The amount of expansion that can be expected depends upon the type and amount of intumescent material that is added to the expandable layer 14 and the thickness of the expandable layer itself. As the thickness of the expandable layer 14 increases, the amount of expansion increases. Preferably, the expandable layer 14 is applied in amounts of from 20 to about 250 mils thickness. Thicker coatings are also useful, but add to the expense of the product. At the preferred coating levels, expansion of the expandable layer 14 greater than one-eighth inch is obtained. Optional ingredients in the expandable layer 14 include all commercially available intumescent coatings.

Referring to FIG. 2, an edge coating 40 is optionally applied on at least one of the edges 24, 26. This edge coating 40 includes a second intumescent material that expands to seal a gap 42 between adjacent panels 10. Other components of the edge coating 40 include water, however, the addition of optional materials to the edge coating 40 is contemplated. Any intumescent material is useful as a second intumescent material. The preferred second intumescent material is vermiculite and/or mica. The second intumescent material is either the same or a different intumescent material than the first intumescent material. Preferably, the edge coating 40 includes only water and the second intumescent material.

The facing material 16 is optionally placed on the outside of all layers on one or more faces 20, 22 and/or one or more of the edges 24, 26 of the panel 10. Use of the facing 16 increases the flexural strength of the panel 10. Any material known for use as a facing 16 is useful. Paper is a very common facing material 16. Multi-ply papers are particularly preferred where one or more plies of a kraft paper are used and topped with one or more layers of manila paper. The manila paper is preferably used on the ply placed toward the living area. Other facing materials are also suitable including polymer sheets and sheeting made of fibers, such as fiberglass. Preparation of gypsum panels having no facing materials is also contemplated.

Either one or both of the faces 20, 22 are covered with a facing material. When both faces 20, 22 are covered, one face is preferably covered with a first facing paper, while the second face is covered with another facing material such as a second facing paper. Frequently the first facing paper and the second facing paper are different, however, panels having the same facing material on both faces 20, 22 is contemplated.

Examples 1-7

Test boards were made according to the formulations of Table 1. Water was measured and placed in the mixing container of a large Waring blender. Dry components were measured and combined with each other, then added to the liquid in the blender container. After soaking for 10 seconds, the blender was turned on for 10 seconds to thoroughly mix the dry ingredients in to the liquid to form a slurry. Sample boards were made by casting the slurry into a mold 12 inches by 14 inches (35.6 cm) by ⅝ inches (16 mm) in thickness. Excess slurry was scraped from the top of the mold. Board weights are reported as the weight per 1000 square feet (93 m$^2$).

TABLE I

| Sample | Component | Core Formula | ELS Formula | ELS Thickness | Board Weight |
|---|---|---|---|---|---|
| 1 Control | Stucco | 1400 g | | 0.0 | 2234 lb (1015 Kg) |
| | Water | 2000 ml | | | |
| | USG 95 | 14 g | | | |
| | Glassfiber | 10 g | | | |
| | CSA | 5 g | | | |
| 2 Uniform Core | Stucco | 1400 g | | 0.0 | 2443 lb (1110 Kg) |
| | Water | 2000 ml | | | |
| | USG 95 | 14 g | | | |
| | Vermiculite | 100 g | | | |
| | Glassfiber | 10 g | | | |
| | CSA | 5 g | | | |
| 3 Uniform Core | Stucco | 1400 g | | 0.0 | 2576 lb (1171 Kg) |
| | Water | 2000 ml | | | |
| | USG 95 | 14 g | | | |
| | Vermiculite | 200 g | | | |
| | Glassfiber | 10 g | | | |
| | CSA | 5 g | | | |
| 4 Two Layer Board | Stucco | 1000 g | 400 g | 0.15 | 2245 lb (1020 Kg) |
| | Water | 1420 g | 580 g | | |
| | USG 95 | 10 g | 4 g | | |
| | Vermiculite | | 40 g | | |
| | Glassfiber | 8 g | 5 g | | |
| | CSA | 3 g | 2 g | | |
| 5 Two Layer Board | Stucco | 1000 g | 400 g | 0.15 | 2314 lb (1051 Kg) |
| | Water | 1420 g | 580 g | | |
| | USG 95 | 10 g | 4 g | | |
| | Vermiculite | | 80 g | | |
| | Glassfiber | 8 g | 5 g | | |
| | CSA | 3 g | 2 g | | |
| 6 Two Layer Board | Stucco | 1000 g | 400 g | 0.15 | 2413 lb (1096 Kg) |
| | Water | 1420 g | 580 g | | |
| | USG 95 | 10 g | 4 g | | |
| | Vermiculite | | 120 g | | |
| | Glassfiber | 8 g | 5 g | | |
| | CSA | 3 g | 2 g | | |
| 7 Two Layer Board | Stucco | 1000 g | 400 g | 0.15 | 2377 lb (1080 Kg) |
| | Water | 1420 g | 580 g | | |
| | USG 95 | 10 g | 4 g | | |
| | Vermiculite | | 160 g | | |
| | Glassfiber | 8 g | 5 g | | |
| | CSA | 3 g | 2 g | | |

A Delta 12 inch bench drill press (Delta International Machinery Corp., Jackson, Tenn.) and 4 inch diameter hole saw were used to cut samples from the centers of 12 inch×14 inch (30.5 cm×35.6 cm) board samples. A 4-inch (~10 cm) diameter disc was taken from each lab made board sample. The drill was run at a low speed so that a smooth sample-cut was obtained. Frayed edges around the sample circumference were avoided as it can result in error in the disc diameter measurement. Both the thickness and outside diameter of each disc was measured prior to testing twice using Mitutoyo Digimatic calipers for accurate measurement (Mitutoyo America Corp., Aurora, Ill.). Each sample was measured twice, once in each of two locations at approximately right angles to each other, and the two measurements were averaged.

Six disc samples were arranged in a 2×3 pattern on an oven floor for each fire test. The samples were placed inside a 3500 watt electric muffle Lindberg/Blue M 1100° C. Moldatherm Box furnace with a digital 16 segment programmable controller (Lindberg/Blue M, Asheville, N.C.). The furnace was located inside a conventional lab hood to safely ventilate the combustion gases generated during the test.

The furnace was programmed to gradually increase temperature to 850° C., maintain that temperature for 36 minutes, then to gradually decrease the temperature. Control parameters were set as follows: P=20, I=40, D=10, Ct=1, SSP=30, SP1=850, TM1=0.01, SP2=850, TM2=1.0, SP3=350, TM3=0.3, SP4=100, TM4=−0.3, SP5=50, TM5=off.

Six disc samples were placed into the furnace at room temperature. The disc samples were positioned close to the furnace end, leaving about a 2 inch (50.8 mm) space from the front door. The hood door was kept open and the hood fan started prior to the start of the test. After closing the furnace door, the program was run, requiring approximately one hour to complete each batch test. The temperature of the furnace was monitored over time and compared to standard curves.

After the furnace program has run and the temperature drops below 50° C. (normally it takes about 3 hours), the samples were removed from the oven and were allowed to cool quickly to the room temperature. A second set of the thickness and diameter measurements were taken. The % amount of diameter shrinkage was calculated as the difference in the average sample diameter before the test and the average sample diameter after the test divided by the average sample diameter before the test, multiplied by 100. The % amount of thickness shrinkage was calculated as the difference in the thickness before and after being fired in the oven, divided by the thickness before firing, multiplied by 100. These values were averaged over three samples for each composition shown in Table I. Shrinkage for firecode gypsum products should be less than 5%.

TABLE II

| Sample | Average % Diameter Shrinkage | Average Start Thickness | Average Finish Thickness | Average % Thickness Shrinkage |
|---|---|---|---|---|
| 1 Control | 4.407 | 0.682 | 0.598 | 12.32 |
| 2 Uniform | 3.570 | 0.697 | 0.651 | 6.60 |
| 3 Uniform | 1.619 | 0.697 | 0.750 | −7.60 |
| 4 Layered | 4.080 | 0.647 | 0.618 | 4.48 |
| 5 Layered | 4.227 | 0.669 | 0.672 | −0.45 |
| 6 Layered | 4.100 | 0.692 | 0.748 | −8.09 |
| 7 Layered | 1.279 | 0.663 | 0.730 | −10.1 |

Results shown above demonstrate that good expansion in thickness is obtained when intumescent material is present only in an expandable layer of a gypsum panel. Additionally, less intumescent material is needed to achieve a particular level of shrinkage reduction compared to distributing the intumescent material throughout the sample. The negative values for the average thickness shrinkage denote that the sample expanded beyond the original thickness of the sample after fire test. Samples 2 and 3 show a reduction in shrinkage with increased amounts of an intumescent material. Amounts of the intumescent material in the expandable layer only increase over samples 4-7. The best results are obtained in samples 6 and 7, even though less vermiculite was used compared to sample 3 having a uniform gypsum layer. Samples 4 and 5 having 40 and 80 grams, respectively, had much less shrinkage than sample 2 having 100 grams of vermiculite. Concentrating the expandable material in a surface expanding layer uses the expansion more effectively and at less cost compared to uniformly distributing it through a gypsum core.

While particular embodiments of the expandable layer for a gypsum panel have been shown and described, it will be appreciated by those skilled in the art that changes and modifications may be made thereto without departing from the invention in its broader aspects and as set forth in the following claims. It should be noted that the features of this invention can be used with each other in any combination.

What is claimed is:

1. A multilayer gypsum panel comprising:
    a core comprising gypsum and a high-temperature shrinkage-resistant material, said core being formed into a panel having at least two opposing faces and two opposing edges, said core being free of intumescent material;
    an expandable layer covering at least a portion of the group consisting of one or more of said faces, one or more of said edges and combinations thereof, said expandable layer comprising a gypsum matrix having a density higher than said core and a first intumescent material wherein said first intumescent material comprises at least one of the group consisting of vermiculite, wollastonite, graphite, and mica; and
    a facing material covering at least a portion of said expandable layer.

2. The panel of claim 1 wherein said high temperature shrinkage-resistant material is at least one of the group consisting of glass fibers, fumed silica, diatomite and clay.

3. The panel of claim 1 wherein said expandable layer covers substantially all of one of said faces.

4. The panel of claim 1 wherein said expandable layer covers substantially all of said edges.

5. The panel of claim 3 wherein said expandable layer further covers substantially all of said edges.

6. The panel of claim 1 wherein said facing material covers at least one of said faces and both of said opposing edges.

7. The panel of claim 6 further comprising an edge coating comprising a second intumescent material, said edge coating being positioned on at least a portion of one of said edges, between said facing material and said expandable layer.

8. The panel of claim 1 having an overall density of about 1800 to about 2600 lb/1000 ft$^2$ with ⅝" thickness.

9. The panel of claim 1 wherein said core has a larger total void volume than said expandable layer.

10. The panel of claim 1 wherein said core comprises less than 0.2% soluble chloride salts by weight.

11. A method of continuously forming a multilayer, fire-resistant panel comprising:
    making a gypsum slurry comprising calcium sulfate hemihydrate, a high temperature shrinkage resistant material and water;
    dividing the gypsum slurry into at least a primary gypsum slurry and a secondary gypsum slurry;
    modifying at least one of the groups consisting of the primary gypsum slurry and the secondary gypsum slurry so that the set and dried gypsum matrix made from the secondary slurry has a higher density than the set and dried gypsum matrix made from the primary slurry;
    adding an intumescent material to the secondary gypsum slurry to make an expandable layer slurry wherein said intumescent material comprises at least one of the group consisting of vermiculite, wollastonite, graphite, and mica;
    forming a gypsum core from the primary gypsum slurry; and
    spreading the expandable layer slurry over at least a portion of a face of the gypsum core.

12. The method of claim 11 further comprising adding foam to the primary gypsum slurry after said dividing step.

13. The method of claim 11 further comprising depositing an edge coating inside said facing material prior to said spreading step.

14. A method of making a fire-resistant gypsum panel comprising:
    making a primary slurry free of intumescent material comprising a first amount of calcium sulfate hemihydrate, a first shrink-resistant material and water;
    making a secondary slurry comprising a second amount of calcium sulfate hemihydrate, a second shrink-resistant material and an intumescent material wherein said intumescent material comprises at least one of the group consisting of vermiculite, wollastonite, graphite, and mica;

modifying at least one of the groups consisting of the primary calcium sulfate hemihydrate slurry and the secondary calcium sulfate hemihydrate slurry so that the set and dried gypsum matrix made from the secondary slurry has a higher density than the set and dried gypsum matrix made from the primary slurry;

pouring the primary slurry onto a first facing material; and pouring the secondary slurry onto the primary slurry.

15. The method of claim 14 wherein the first shrink-resistant material is the same as the second shrink resistant material.

16. The method of claim 14 further comprising placing a second facing material adjacent to the secondary slurry.

17. The method of claim 16 wherein the second facing material is the same as the first facing material.

18. The method of claim 14 wherein said second pouring step comprises covering at least one face and at least one edge with the secondary slurry.

* * * * *